March 3, 1931. V. I. ZELOV 1,794,749
GYROSCOPIC TURN INDICATOR
Filed May 9, 1929 2 Sheets-Sheet 1

INVENTOR
V. I. Zelov.
BY A. B. Reavis
ATTORNEY

March 3, 1931.  V. I. ZELOV  1,794,749

GYROSCOPIC TURN INDICATOR

Filed May 9, 1929  2 Sheets-Sheet 2

WITNESSES:
E. Lutz

INVENTOR
V. I. Zelov.
BY
A. B. Reavis
ATTORNEY

Patented Mar. 3, 1931

1,794,749

UNITED STATES PATENT OFFICE

VICTOR I. ZELOV, OF ROSEMONT, PENNSYLVANIA, ASSIGNOR TO AIRCRAFT CONTROL CORPORATION, A CORPORATION OF PENNSYLVANIA

GYROSCOPIC TURN INDICATOR

Application filed May 9, 1929. Serial No. 361,817.

My invention relates to gyroscopic apparatus and more particularly to that of the turn indicator type.

In accordance with my invention, I provide a turn indicator of the gyroscopic type for use on any suitable transportation apparatus, for example, in connection with aircraft. The indicator includes a frame having its pivotal axis extending in a fore-and-aft direction and carrying a spinning rotor whose axis is disposed athwartship. The apparatus or aircraft constitutes the support for the frame; and turning motion of the aircraft substantially about the vertical constitutes one of the rotary degrees of freedom of the gyroscopic apparatus, the other two rotary degrees of freedom being the frame pivot axis and the rotor spinning axis. When the aircraft turns, a torque is applied about the vertical and precession takes place about the frame pivot axis. The precessional motion is used to operate the indicating element. It is an object of my invention to provide apparatus of this character, arranged substantially as just pointed out, and serving the purposes indicated.

It is a further object of my invention to provide apparatus of this character having means for driving the spinning rotor in such a way that precessional movement is not interfered with by the driving means.

A further object of my invention is to provide a gyroscopic rotor having a friction wheel element engaged by a driving friction wheel, the point or region of engagement being preferably intersected by the precession axis.

A further object of my invention is to provide a gyroscopic rotor consisting of a pair of inertia members and an interposed friction wheel element together with a driving friction wheel for driving the friction wheel element.

A further object of my invention is to provide reversible transmission means between the gyroscopic frame and the indicator operating member so that the same indicia may be used irrespective of the direction of spin of the rotor.

A further object of my invention is to provide spring means in connection with the gyroscopic frame to maintain pressure of contact of the frictional gearing, to restore the gyroscopic apparatus to normal, or zero, position as soon as turning shall have ceased, and to provide for a desired sensitivity of movement.

A further object of my invention is to provide apparatus of the character referred to with damping means.

These and other objects are effected by my invention, as will be apparent from the following description and claims taken in connection with the accompanying drawings, forming a part of this application, in which:

Figure 8:
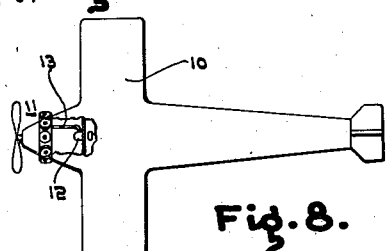
Fig. 8 is a diagrammatic view of an aeroplane with my invention applied thereto.
Figure 9:
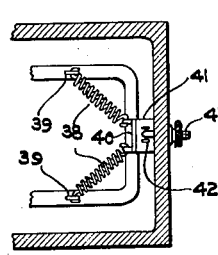
Fig. 9 is a detail view showing the spring mechanism.

Referring now to the drawings more in detail, I show suitable transportation apparatus, for example, air craft 10 (see Fig. 8) provided with propulsion machinery indicated generally at 11. A turn indicator 12 is located at a suitable place on the transportation apparatus, or aircraft, and it is arranged to be operated by any suitable means.

Figure 1:
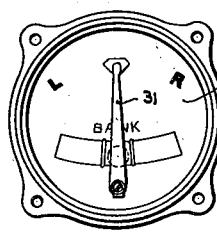
Fig. 1 is a front elevation of the instrument.
Figure 2:
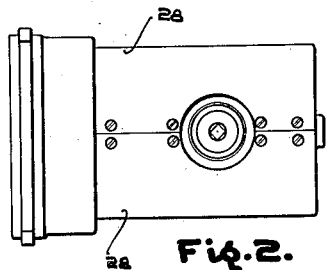
Fig. 2 is a side elevation.
Figure 3:
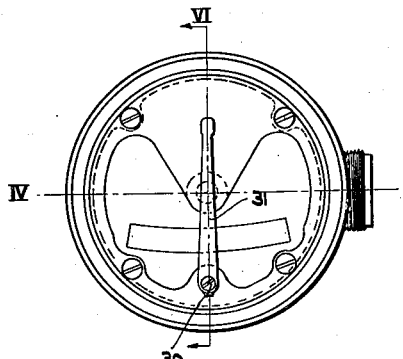
Fig. 3 is a front elevation with the dial removed.
Figure 4:
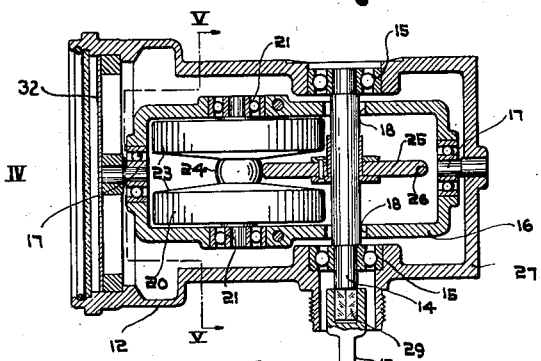
Fig. 4 is a longitudinal sectional view taken along the line IV—IV of Fig. 3.
Figure 5:
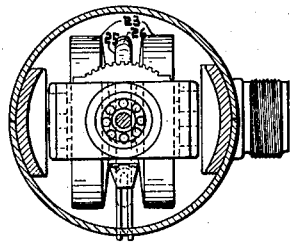
Fig. 5 is a transverse sectional view taken along the line V—V of Fig. 4.
Figure 6:
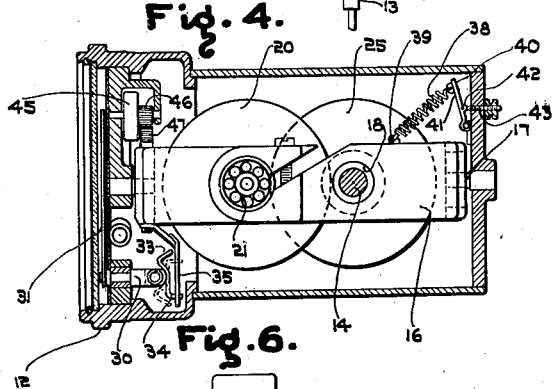
Fig. 6 is a longitudinal sectional view taken along the line VI—VI of Fig. 3.
Figure 7:
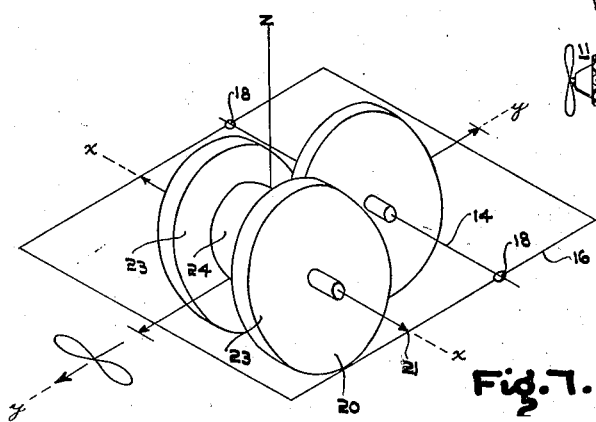
Fig. 7 is a diagrammatic view illustrating principles of the invention.

In accordance with the preferred form of my invention shown in Figs. 1 to 8, inclusive, the turn indicator 12 includes a driving shaft 14 connected to a flexible shaft 13, the driving shaft 14 being carried by bearings 15 fixed with respect to the supporting body or aircraft. A gimbal frame 16 is supported by pivotal connections 17 provided on the supporting body or aircraft. The driving shaft 14 has suitable clearance with respect to the frame 16, permitting the desired precessional motion of the latter; and preferably the clearance is such that the shaft 14 and the frame 16 are arranged to contact to limit precessional motion. For example, I show the frame 16 having openings 18 larger than the shaft 14 and through which the latter passes. A rotor 20 is pivoted at 21 with respect to the frame 16. The arrangement is such that the spinning axis of the rotor, axis x—x of Fig. 7, is normal to the frame pivot axis y—y of Fig. 7; and the frame pivot axis is disposed in a fore-and-aft direction and the rotor spinning axis is disposed athwartship.

The rotor 20 preferably includes a pair of inertia, or fly wheel members 23 operated by suitable gearing or mechanism which is of such a character as to interfere to a minimum with precessional movement. By way of example, I show an interposed propelling or friction wheel element 24, operated by a friction wheel 25 on the driving shaft 14. The friction wheel 25 preferably has a crowned periphery 26 made of material having suitable hardness and elasticity, for example, vulcanized rubber. The point or region of engagement of the friction wheel 25 with the friction wheel element 24 lies in or it is intersected by the frame pivot or precessional axis, axis y—y of Fig. 7, and the center of gravity of the rotor 20 lies on such axis. Therefore, the entire effort of the driving mechanism is exerted in spinning the rotor without any torque resulting therefrom and tending to cause precession.

Figure 12:
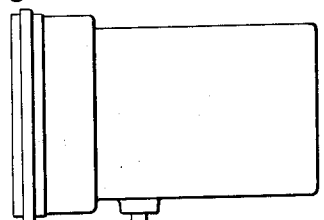
Fig. 12 shows a propeller drive for the gyro rotor.

The flexible shaft 13 may be operated by the propulsion machinery (Fig. 8) or by means of an air-driven propeller (Fig. 12) and it is connected to the driving shaft 14, the latter being carried by the bearings 15 provided on the fixed frame member 27, which supports the pivotal connections 17 and the gimbal ring or frame 16. Casing elements 28 are connected to the frame 27 so as to enclose the apparatus. As shown, the flexible shaft 13 is of the type well known in the art, for example, of the speedometer type, and it is provided with detachable connections both with respect to the propulsion machinery and with respect to the gyroscopic apparatus. In the drawing, I show one end of the driving shaft 14 modified at 29 (Fig. 4) to receive one end of the flexible shaft 13.

The fixed frame 27 also supports an indicator operating member or shaft 30, the latter being connected to a hand 31 cooperating with a dial 32 provided with a suitable indicia. The operating member 30 is connected to the precession or gimbal frame 16 so that precessional movement of the latter will result in turning of the operating member 30 and also movement of the hand 31.

As propulsion machinery may operate in either direction, it is necessary that a reversible connection be interposed between the gimbal frame 16 and the hand 31 if the latter is to move in the correct direction irrespective of the direction of motion of the propulsion machinery. Therefore, I provide the operating member or shaft 30 with upper and lower movable arms 33 and 34 either of which may be engaged with the arm 35 on the precession frame or gimbal 16 (see Fig. 6).

The apparatus so far described operates as follows: Assuming that the turn indicator is mounted on aircraft with the spinning axis of the rotor, axis x—x of Fig. 7, arranged athwartship, with the pivot axis of the gimbal or precession frame 16, axis y—y of Fig. 7, disposed in a fore-and-aft direction and with the rotor turned at a suitably high speed, a turn of the aircraft either to the right or to the left results in a torque being applied to the gyroscope, applied about axis z Fig. 7, and the latter precesses about the fore-and-aft axis, axis y—y Fig. 7, to operate the indicator, this motion of the frame 16 readily taking place as the openings 18 are larger than the shaft 14 and the region of friction gear contact is intersected by the precession axis.

The gearing for operating the rotor results in little, if any, interference with the precessional indicating movement. The construction of the rotor provides for a relatively small friction wheel element between the inertia members and the driving friction wheel may be made of relatively larger diameter and extend in between the inertia members to engage the friction wheel element, thereby providing for a very compact arrangement and a considerable increase in speed. Furthermore, as the point or region of engagement of the friction wheel with the friction wheel element is intersected by or lies on the precessional axis, the gearing does not produce any torque tending to disturb the apparatus.

The arrangement of gearing exerts a stabilizing, damping or righting effect. While the driving friction wheel theoretically engages the friction wheel element at a single point, nevertheless, it will be apparent that, in practice, any degree of pressure existing between the driving friction wheel and the friction wheel element will result in a certain amount of deformation of these parts, particularly of the driving friction wheel element, as the latter is preferably made of an elastic, wear-resisting substance of suitable hardness, such as vulcanized rubber. When the precession or gimbal frame 16 tilts, the driving friction wheel engages the driven friction wheel element somewhat askew, and it will exert a force on the latter tending to resist precession. These two effects, namely a somewhat flattened region of engagement and the increasing elliptical path on the friction gear element with increasing precession, damp precessional motion, limit oscillation and over-travel, and stabilize the apparatus.

As wear may take place between the driving friction wheel and the driven friction wheel element, I preferably provide take-up means for biasing the precession frame 16 toward the driving friction wheel, whereby wear is compensated for and a suitable pressure is maintained on the frictional transmission. As shown, I provide spring means 38 connected at 39 to the precession frame 16 and connected at 40 with respect to the stationary frame 27. Not only does the spring means 38 serve the purposes just pointed out, but also exerts a righting effect. When precession takes place, the spring means 38 is elongated proportionally to the precession. Hence, precession is resisted, not only by the gearing effect heretofore pointed out, but also by the increasing elongation of the spring means. As soon as the ship ceases turning, one of the rotary degrees of freedom becomes suppressed, and then the energy stored in the spring means 38, as well as the force exerted by the gearing, are effective to move the precession frame back to normal or zero position. Also the spring means serves to control the sensitivity of the apparatus. Preferably spring means embodies two springs connected to opposed side portions of the frame 16. The springs may be inclined to give suitable components for righting and sensitivity.

In order that sensitivity of the instrument may be varied, I provide means for adjusting the tension of the spring means. For example, this may be done by making the connection 40 adjustable. In the drawings, I show the connection 40 carried by the upper end of a lever 41 which is hinged at its lower end to the casing and which has, at an intermediate point, a swivelled connection 42 with respect to the adjusting screw 43. In this way, displacement of the screw results in magnified movement of the connection 40.

Figure 10:
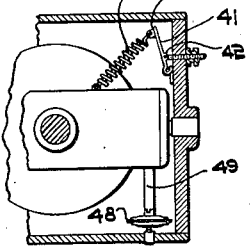
Figs. 10 and 11 show modified forms with air dampers.
Figure 11:
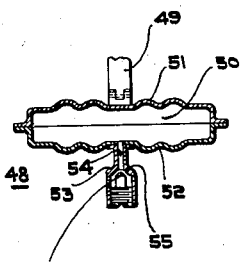

A damper of any suitable type is preferably associated with the gimbal frame 16 to damp oscillations about the precession or frame pivot axis. In Fig. 6, a small fly wheel or inertia member 45 serves this purpose. The fly wheel is carried by the supporting structure 27 and it is provided with a pinion 46 meshing with a sector 47 on the gimbal frame 16. Hence, the fly wheel is effective to resist oscillations. Dashpot means of any suitable type may serve the same purpose. In Figs. 10 and 11, I show an air dashpot 48 carried by the supporting structure and it has a link connection 49 with the frame 16. The dashpot 48 has a displacement chamber 50 defined in part by the deflectable upper and lower heads 51 and 52, respectively. The upper head 51 is connected to the link 49 and the lower head 52 is connected to a hollow stem 53 carried by the supporting structure 27 and constituting a support for the dashpot. The bore 54 of the stem 53 is in open communication with the chamber 50 and it is provided with a valve seat 55 with which cooperates the adjustable needle valve 56. With this form, energy which would otherwise manifest itself in oscillations of the frame is absorbed in forcing air in either direction through the restricted orifice.

Figure 13:
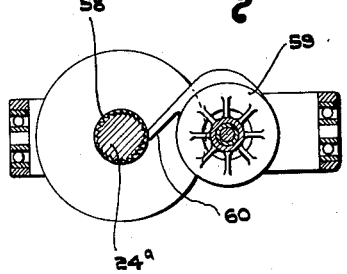
Figs. 13 and 14 show a gyro driven by air supplied by a blower.
Figure 14:
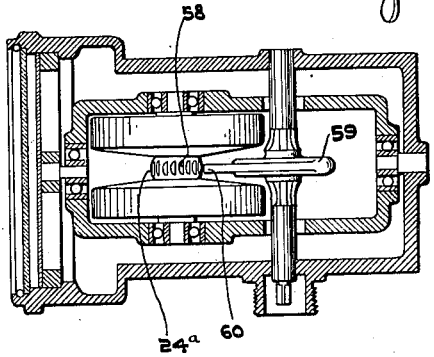
Figure 15:
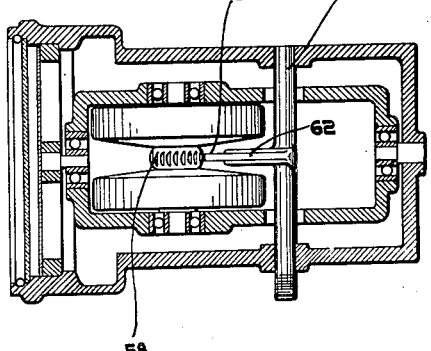
Figs. 15 and 16 show a further form of air-driven apparatus.
Figure 16:
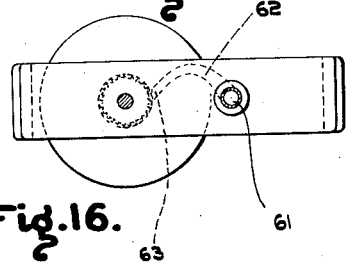
Figure 17:
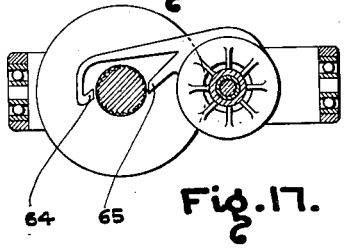
Fig. 17 shows a form similar to Figs. 13 and 14 but having two nozzles.

If desired, the rotor 20 may be driven by an elastic fluid jet. Referring to Figs. 13 to 17, inclusive, the wheel member 24a intermediate the fly wheels 23 is formed with peripheral buckets 58 adapted to be acted upon by a jet. In Figs. 13 and 14, the high-velocity jet is provided by a blower 59 arranged between the side members of the gimbal frame 16 and discharging through a nozzle 60. In Figs. 15 and 16, a motive fluid conduit 61 extends into the frame 16 and it has a branch 62 terminating in a nozzle 63. The nozzles are preferably so arranged that the jets impinge in the region of the precession axis to avoid disturbing moments. If desired, as shown in Fig. 17, opposed jets 64 and 65 may be employed. With these forms of the apparatus the air supply means serves to limit precession.

While I have shown and described the apparatus as applied to aircraft, it will be understood that it may be used with any suitable vehicle to indicate turning. Furthermore, while I show the gyroscopic rotor driven from aircraft propulsion machinery, it will be obvious that the spinning motion could be derived from any suitable source.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In an aircraft turn indicator, the combination of supporting structure, a frame pivoted with respect to said structure about an axis normally horizontal and extending fore-and-aft of the aircraft, a rotor carried by the frame and having its axis of spin disposed athwartship of the air craft and normally with respect to said pivotal axis, a rotary driving member carried by the supporting structure and with respect to which the frame is tiltable, and means for transmitting motion from the rotary driving member to the rotor and providing for relative tilting of the rotor and frame with respect to the rotary driving member.

2. The combination with aircraft having propulsion machinery, of a gyroscopic turn indicator including a frame pivoted with respect to the aircraft about a fore-and-aft axis, a rotor carried by the frame and having its spinning axis disposed normally with respect to the frame pivot axis, and means for transmitting motion from the propulsion machinery to the rotor and providing for tilting of the frame and rotor about the frame pivot axis.

3. The combination with aircraft having propulsion machinery, of a gyroscopic turn indicator including a frame pivoted with respect to the aircraft about a fore-and-aft axis, a rotor carried by the frame and having its spinning axis disposed normally with respect to the frame pivot axis, a driving gear member driven from the propulsion machinery and supported by the aircraft, and a driven gear provided on the rotor and operated by the driving gear, said frame and the gearing providing for tilting of the frame and rotor about the frame pivot axis and relatively to the driving gear.

4. The combination with aircraft having propulsion machinery, of a gyroscopic turn indicator including a frame pivoted with respect to the aircraft about a fore-and-aft axis, a rotor carried by the frame and having its spinning axis disposed normally with respect to the frame pivot axis, a driving friction wheel whose axis is non-tiltable with respect to the aircraft, a driven friction member provided on the rotor and engaging said wheel, the point of engagement of said wheel and member being in the frame pivot axis, and means for transmitting motion from the propulsion machinery to said driving friction wheel.

5. In gyroscopic apparatus, the combination of a support, a frame, pivotal means for supporting the frame from the support, a rotor carried by the frame and having its spinning axis disposed normally with respect to the frame pivot axis, said rotor including a pair of inertia members and an interposed driven friction wheel element, and a driving friction wheel carried by the support and driving said driven friction wheel element.

6. In gyroscopic apparatus, the combination of a frame, pivotal supporting means for the frame, a rotor carried by the frame and having its spinning axis disposed normally with respect to the frame pivot axis, said rotor including a pair of inertia members and an interposed operating wheel element, and means for driving said operating wheel element, said last-named means having clearance with respect to the frame so that the latter may have a desired range of precession and adapted to contact with the frame to limit precession.

7. In gyroscopic apparatus, the combination of a frame, pivotal supporting means for the frame, a rotor carried by the frame and having its spinning axis disposed normally with respect to the frame pivot axis, said rotor including a driven friction wheel portion, and a driving friction wheel disposed within the frame and having a crowned periphery engaging said driven friction wheel element, the point of engagement of the driving friction wheel and of the driven wheel portion being on the frame pivotal axis.

8. In gyroscopic apparatus, the combination of supporting means, a driving shaft carried by the supporting means, a frame pivoted to the supporting means about an axis substantially normal to that of the driving shaft and having clearance spaces permitting of tilting of the frame relative to the driving shaft, a rotor carried by the frame and having its axis disposed normally with respect to the frame pivot axis, said rotor including a friction wheel element, a friction wheel carried by the driving shaft and engaging said frictional wheel element, and spring means connected to the supporting means and to the frame and biasing the latter in the direction of its pivotal axis to maintain the rotor frictional wheel element in engagement with said friction wheel.

9. In gyroscopic apparatus, the combination of a driving shaft, a frame having its pivotal axis disposed transversely with respect to the driving shaft and capable of tilting relatively to the driving shaft, a rotor carried by the frame and having its spinning axis disposed normally with respect to the frame pivot axis, and means for transmitting motion from the driving shaft to the rotor and providing for tilting motion of the frame and rotor relatively to the driving shaft.

10. In gyroscopic apparatus, the combination of a driving shaft, a frame having its pivotal axis disposed transversely with respect to the driving shaft and having openings larger than the cross section of the driving shaft and through which the latter extends, a rotor carried by the frame and having its spinning axis disposed normally with respect to the frame pivot axis, and means for transmitting motion from the driving shaft to the rotor and providing for tilting motion of the frame and rotor relatively to the driving shaft.

11. In gyroscopic apparatus, the combination of a driving shaft, a frame having its pivotal axis disposed transversely with respect to the driving shaft and having clearance spaces providing for tilting thereof relative to the driving shaft, a rotor carried by the frame and having its spinning axis disposed normally with respect to the frame pivot axis, said rotor including a pair of inertia members and an interposed friction wheel element, and a friction wheel on the driving shaft and engaging the friction wheel element.

12. In a turn indicator having an indicator operating member, the combination of a frame, pivotal means for supporting the frame, a rotor carried by the frame and having its spinning axis disposed normally of the axis of said pivotal means, means for spinning the rotor, and a reversible motion transmitting connection between the frame and said operating member.

13. In a turn indicator, the combination of a pivoted indicator operating shaft having arms extending oppositely therefrom, a frame, means for pivotally supporting the frame, a rotor carried by the frame and having its spinning axis disposed normally of the axis of said pivotal means, means for spinning the rotor, and means movable with the frame and connectible to either of said arms for operating the same.

14. In apparatus of the character described, the combination of a supporting body, a gimbal frame pivoted to the body, a rotor carried by the gimbal frame and having its spinning axis disposed normally with respect to the gimbal frame pivot axis, said rotor including a pair of spaced fly wheel elements and an intermediate propelling element, and means carried by said support and cooperating with the propelling element to rotate the latter, clearance being provided between the last-named means and the frame to permit tilting of the latter.

15. In apparatus of the character described, the combination of a supporting body, a gimbal frame pivoted to the body, a rotor carried by the gimbal frame and having its spinning axis disposed normally with respect to the gimbal frame pivot axis, said rotor including a pair of spaced fly wheel elements and an intermediate propelling element, means for imparting spinning motion to the rotor, and spring means connected to the frame and to the supporting body.

16. In apparatus of the character described, the combination of a supporting body, a gimbal frame pivoted to the body, a rotor carried by the gimbal frame and having its spinning axis disposed normally with respect to the gimbal frame pivot axis, said rotor including a pair of spaced fly wheel elements and an intermediate propelling element, means for imparting spinning motion to the rotor, and means for damping oscillations of said frame.

In testimony whereof, I have hereunto subscribed my name this 20th day of April, 1929.

VICTOR I. ZELOV.